US005891301A

United States Patent [19]

Kerr, Jr.

[11] Patent Number: 5,891,301

[45] Date of Patent: Apr. 6, 1999

[54] SELF ADHESIVE LABEL APPLICATOR TOOL

[76] Inventor: Frederick Aaron Kerr, Jr., 1804 D Ave., Lawton, Okla. 73501

[21] Appl. No.: 670,571

[22] Filed: Jun. 26, 1996

[51] Int. Cl.$^{6}$ ........................................ C09J 5/00

[52] U.S. Cl. ........................................ 156/579; 156/540

[58] Field of Search ........................................ 156/540, 579; 221/73; 602/22

[56] References Cited

U.S. PATENT DOCUMENTS 3,957,562 5/1976 Hamisch, Jr. ........................................ 156/540

*Primary Examiner*—James Engel
*Assistant Examiner*—Linda L. Gray

[57] ABSTRACT

A sticker applicator and a method of using the sticker applicator for applying self adhesive sticker to an article. The sticker applicator comprises a plate bent to form an angle across a portion thereof, a ring portion attached to the top surface of the plate through which a finger is placed for use, and an aperture formed in the plate to receive a portion of the finger.

2 Claims, 3 Drawing Sheets

SELF ADHESIVE LABEL APPLICATOR TOOL

BACKGROUND OF INVENTION

Field of the Invention

This invention relates to a simple apparatus for application, by hand, of a self adhesive promotional sticker to a product for added information about the product.

SUMMARY OF THE INVENTION

The invention disclosed herein comprises a hand applicator by means of which self adhesive promotional stickers can be applied to products by retail merchants or wholesale sales representatives for the aid in resale of the products. Special self adhesive promotional stickers are available in a large variety of colors, sizes, and shapes, which not only catch the eye of a prospective customer, but also inform, at a glance, the special price that is to be paid for such products.

In the retail business, it is common knowledge that these self adhesive promotional stickers assist in the sale of an item more so than without. In most cases, an item that is being promoted is usually in great quantity. Therefore, the time invested in actually placing the self adhesive promotional stickers on by hand, one by one, is too time consuming to be cost effective. The self adhesive sticker applicator, according to the present invention, aids the wholesaler/retailer in meeting the need for a quick efficient way to separate the self adhesive stickers from a backing and apply the self adhesive stickers to items for resale, in a very time productive manner, which in turn, will generate greater sales.

BRIEF DESCRIPTION OF THE DRAWINGS

The invention is described hereinafter in greater detail by reference to the drawings in which.

DETAILED DESCRIPTION OF THE INVENTION AND PREFERRED EMBODIMENTS

Figure 1:
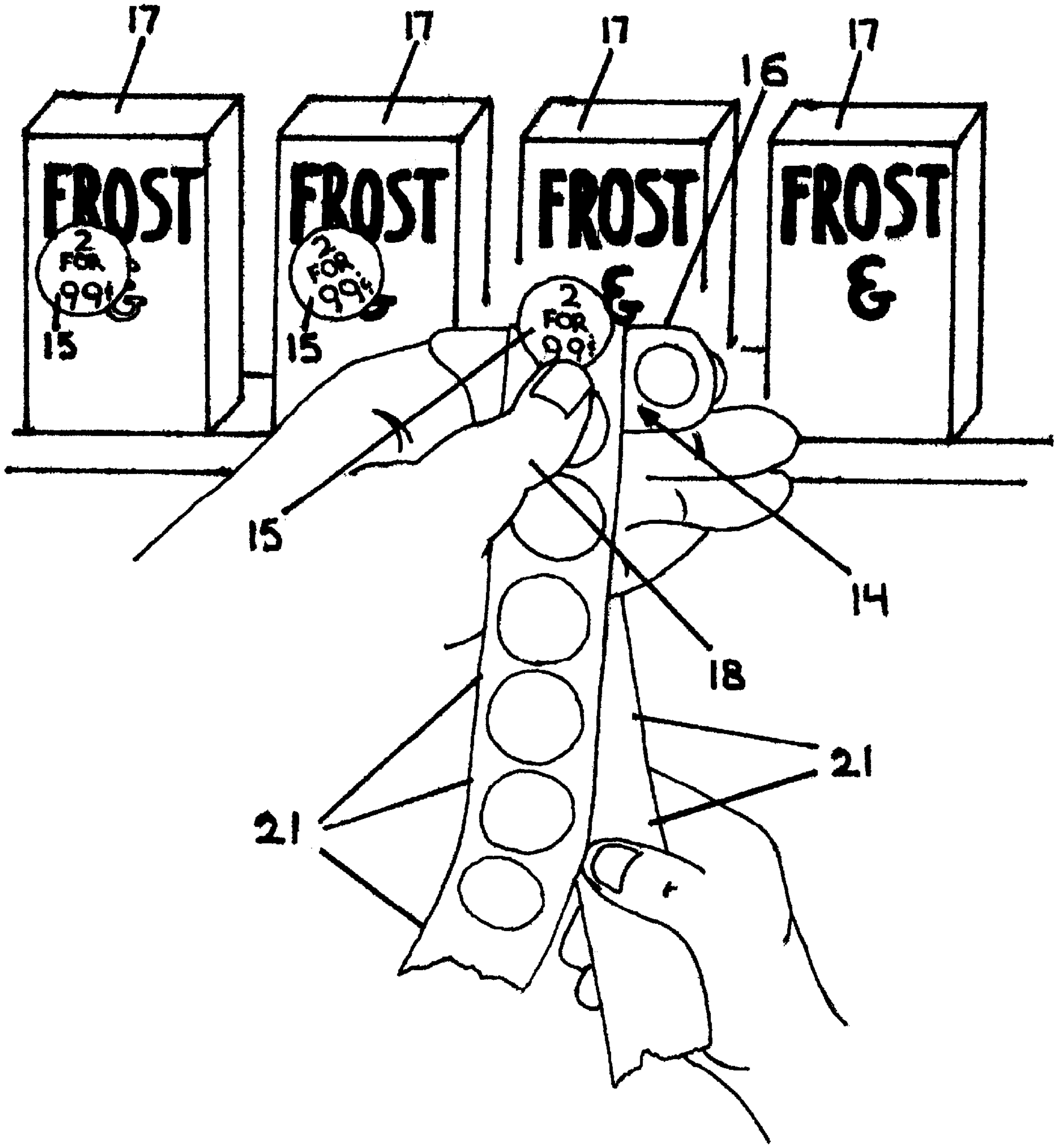
FIG. 1 displays the actual position of the applicator during operation.

Turning now to the drawings there is shown (FIG. 1) applicator 14, comprising plate 10, for application of self adhesive stickers 15 supported on sticker tape 21 which are applied by pulling sticker tape 21 over straight edge 16 of plate 10 and attaching a lead self adhesive sticker 15 to product 17 by simultaneously pressing thumb 18 onto the back of the lead self adhesive sticker 15 and applying pressure to assure adhesion to product 17.

Figure 2:
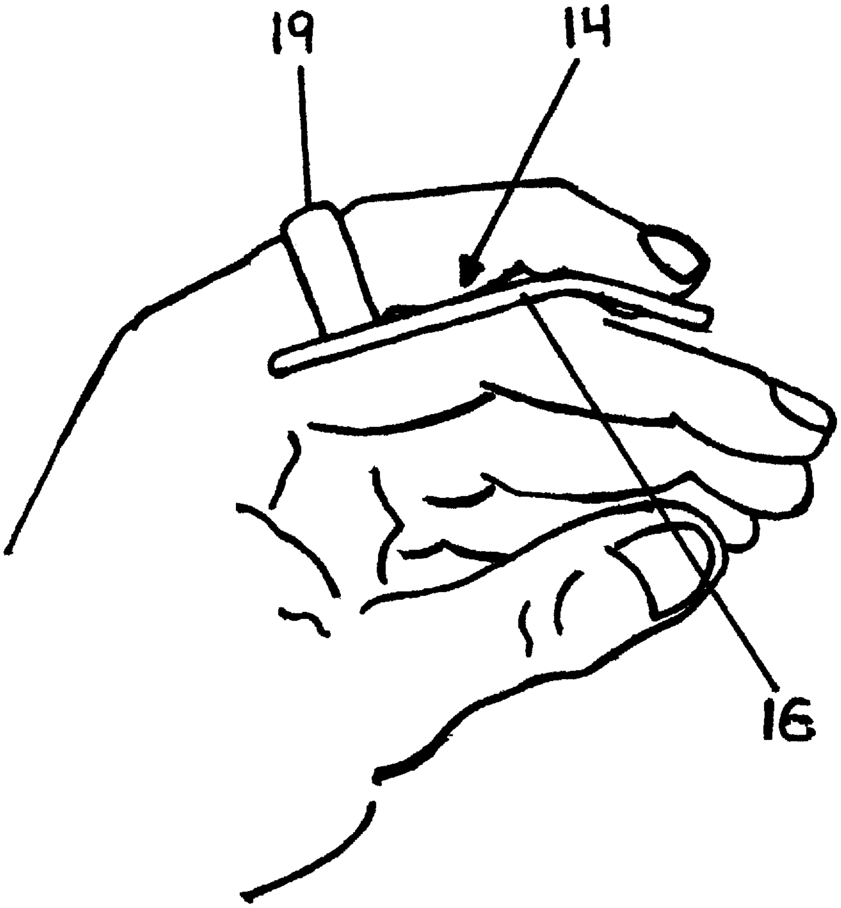
FIG. 2 is a top view looking straight down on how the applicator is fitted on the hand.

Applicator 14 is provided with (FIGS. 2, 3A–3C, and 3E) ring portion 19 on the top surface of plate 10, which is adjustable to fit any finger, and (FIG. 1, 3, and 3A–3D) finger hole 20 which, together, give the user stability in operation. Applicator 14 (FIGS. 1 and 2) is placed on a finger such that the finger is through ring portion 19 where the finger rests on the top surface of plate 10. Nail portion 5 of the finger faces away from the top surface. A portion of the finger, under nail portion 5, rests in finger hole 20. Sticker tape 21 (FIG. 1) is placed over straight edge 16 of plate 10 where part of sticker tape 21 lies across the bottom surface of plate 10 and part of sticker tape 21 lies across top surface of plate 10.

Applicator 14 (FIG. 3E) is bent at a 170° angle between ring portion 19 and finger hole 20. When (FIG. 1) sticker tape 21 is pulled over straight edge 16 of plate 10, a lead self adhesive sticker 15 separates itself from sticker tape 21 instead of following the path of sticker tape 21 being pulled over straight edge 16 of plate 10 to be attached by pressure of thumb 18 to product 17.

Applicator 14 can be made from various materials, e.g., various plastic material, such as polyvinyl chloride, polyamides, polyethylene, etc. and metal. When made of plastic, it may be injection molded. It is preferred, however, that applicator 14 be entirely stamped from a piece of metal.

Figures 3A, 3B, 3C, 3D, 3E:
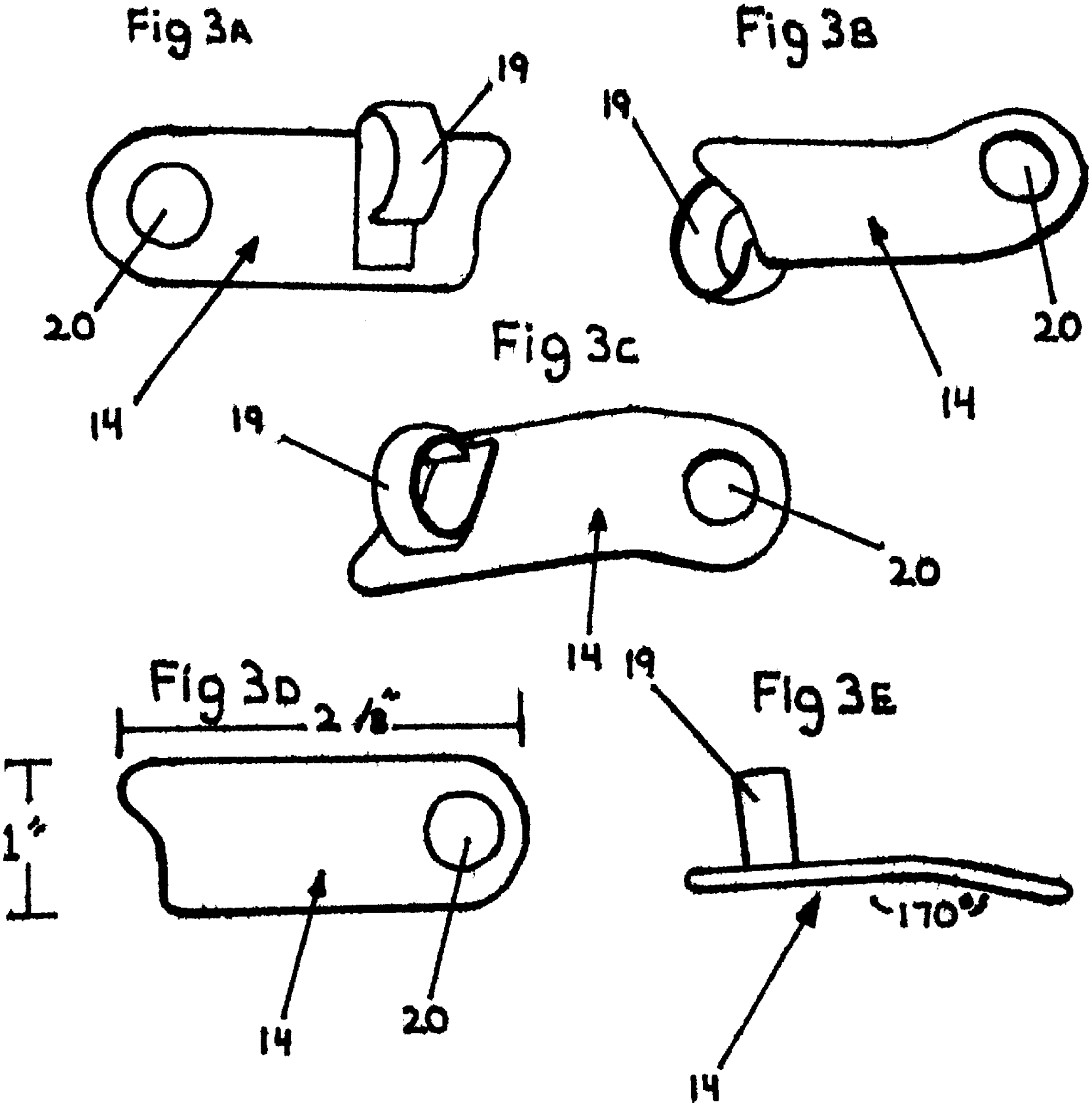
FIGS. 3A–3E display several angles of the applicator when not fitted for operation.

The size of plate 10 of applicator 14 and other components of applicator 14 depend on the size of the "user's" hand and finger. The width and length of plate 10 of applicator 14, as well as the size of ring portion 19 and the diameter of finger hole 20, are determined by the average finger length and average finger thickness; approximately 1" wide and 2 ⅝" long for plate 10 (FIG. 3D) and finger hole 20 is ½" in diameter (FIG. 3D).

What is claimed:

1. A sticker applicator comprising a plate having a top surface and a bottom surface where the plate is bent to form an angle across a portion thereof to form two plate subportions, a ring portion attached to the top surface of one of the two plate subportions, and an aperture formed in the plate where the aperture is located on one of the two plate subportions not having the ring portion attached thereto.

2. A method for applying a sticker to an article comprising:

- providing a sticker applicator comprising a plate having a top surface and a bottom surface where the plate is bent to form an angle across a portion thereof to form two plate subportions, a ring portion attached to the top surface of one of the two plate subportions, and an aperture formed in the plate where the aperture is located on one of the two plate subportions not having the ring portion attached thereto;
- placing the sticker applicator on a finger such that the finger is through the ring portion and rests on the top surface where the nail portion of the finger faces away from the top surface and a portion of the finger, under the nail portion, rests in the aperture;
- providing a supply of self adhesive stickers supported on a tape;
- placing the tape over an edge portion of the plate such that a first portion of the tape lies across the bottom surface and a second portion of the tape lies across the top surface;
- pulling the tape over the edge portion using the second portion such that a lead sticker separates from the tape above the edge portion;
- applying pressure to a back portion of the lead sticker and pressing the lead sticker onto the article to adhere the lead sticker to the article.

* * * * *